United States Patent [19]

Robins

[11] 4,274,648
[45] Jun. 23, 1981

[54] VEHICLE BUMPER STEP

[76] Inventor: Robert R. Robins, 721 Woodland, Minneapolis, Kans. 67467

[21] Appl. No.: 27,422

[22] Filed: Apr. 5, 1979

[51] Int. Cl.³ .............................................. B60R 3/02
[52] U.S. Cl. .................................... 280/166; 182/91; 182/92; 224/42.03 R
[58] Field of Search ............... 280/166, 163; 293/117; 182/93, 91, 90; 224/42.08, 42.07, 42.03 R, 42.03 A

[56] References Cited

U.S. PATENT DOCUMENTS

| 3,017,949 | 1/1962 | Harlan | 182/92 |
| 3,159,242 | 12/1964 | James | 182/92 |
| 3,357,719 | 12/1967 | McCrea | 280/163 |
| 3,897,084 | 7/1975 | Bergskoog | 280/166 |
| 3,905,527 | 9/1975 | Chamberlain | 293/117 X |
| 4,057,125 | 11/1977 | Kroft | 280/166 X |

FOREIGN PATENT DOCUMENTS 1541411  2/1979  United Kingdom .................... 280/166

*Primary Examiner*—Randolph A. Reese
*Assistant Examiner*—Milton L. Smith
*Attorney, Agent, or Firm*—Robert K. Rhea

[57] ABSTRACT

A vehicle bumper step formed by an upwardly open frame having clamp members secured to its upper surface for mounting the frame on a vehicle bumper by gripping a bumper flange. Longitudinally adjustable arms, connected with the frame, project toward a vertical surface of the bumper for stabilizing the position of the frame relative to the bumper. A step having a tread portion is movable from a first position nested by the frame to a second position projecting horizontally beyond the bumper in a direction outwardly from the vehicle and includes a hook portion engaging the frame normally preventing separation of the step relative to the frame.

3 Claims, 8 Drawing Figures

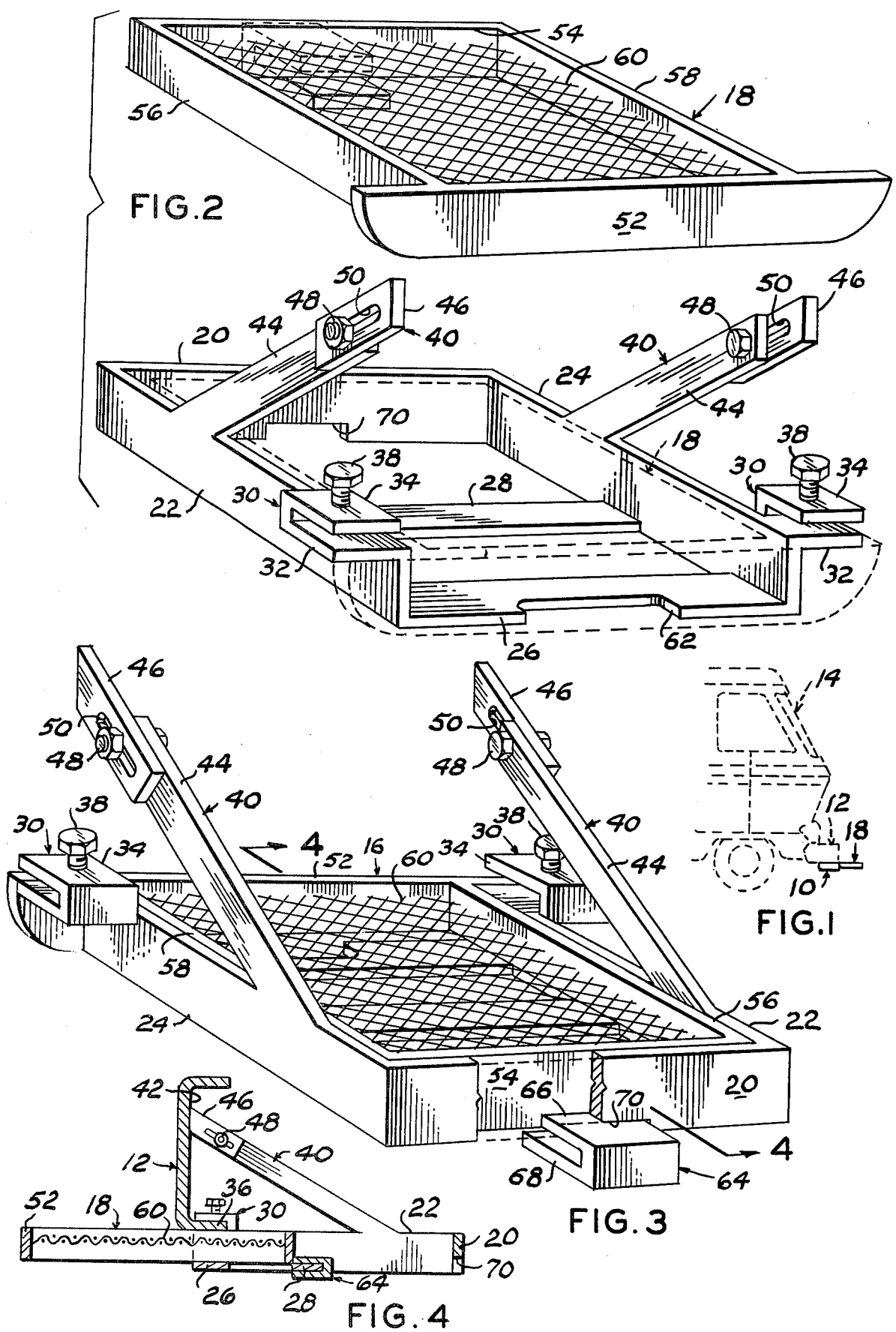

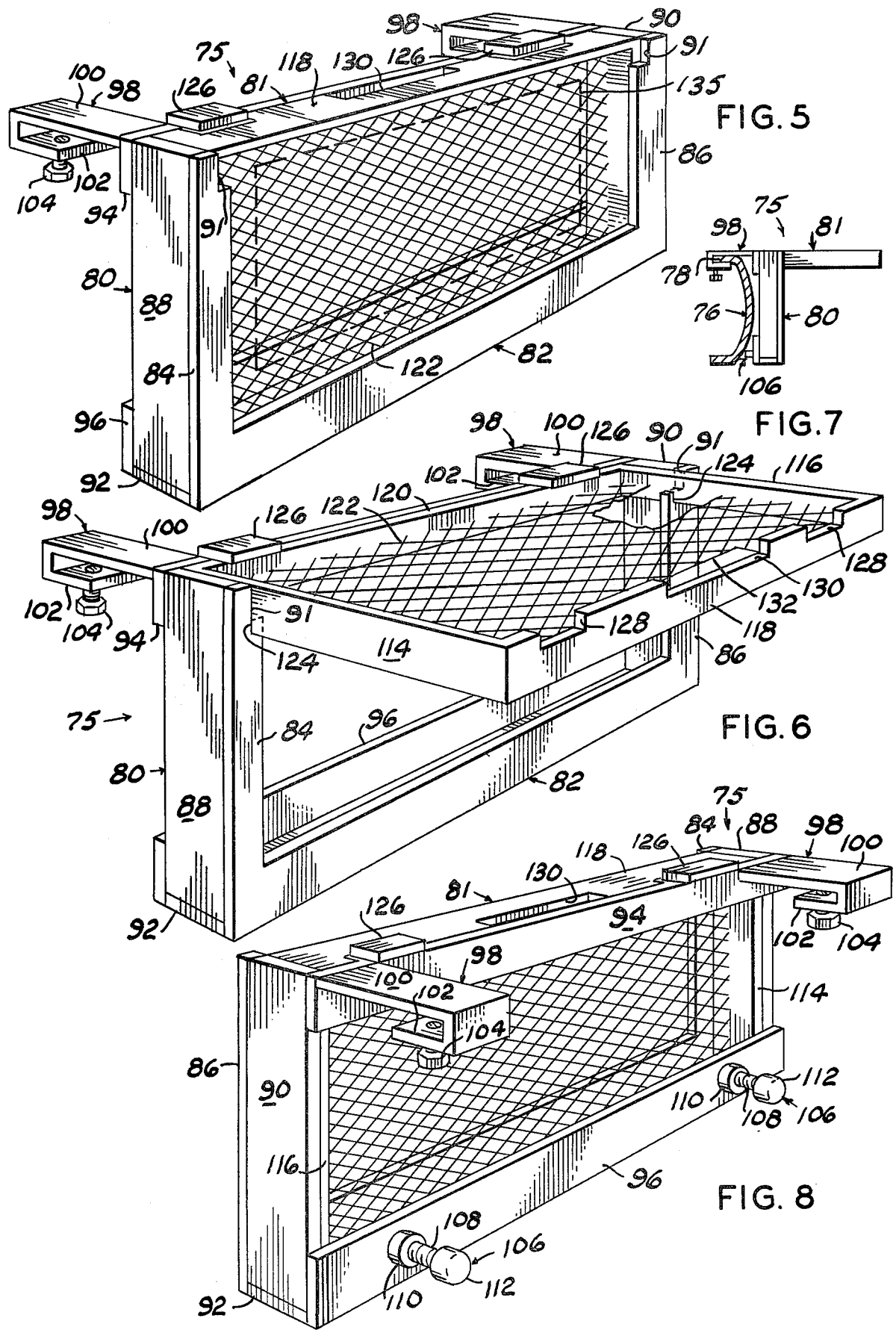

VEHICLE BUMPER STEP

BACKGROUND OF THE INVENTION

1. Field of the Invention

The present invention relates to vehicle accessories and more particularly to a bumper step providing access to the vehicle from its forward or rearward ends.

The windshield on large vehicles, such as diesel truck-tractors or busses, is mounted a substantial distance above the surface of the earth and it is usually necessary for the attendant to use a step ladder, or the like, in order to reach and thoroughly clean the windshield.

This invention provides an extendable and retractable step member to be mounted on the bumper of such vehicles for access to the windshield or other components.

2. Description of the Prior Art

The prior art patents generally disclose a number of bumper or vehicle connected retractable steps, such as U.S. Pat. Nos. 3,017,949; 3,357,719 and 3,897,084 which generally require some modification of the bumper or vehicle frame members, such as by drilling holes therein for attaching components of the bumper step thereto.

This invention, on the other hand, provides an extendable and retractable step member having a tread area supported by a frame gripping horizontal flange portions of a bumper and maintained in a desired orientation with respect to the bumper by frame connected adjustable arms projecting toward a vertical surface of the bumper. The step member is normally nested by the frame in an out-of-the-way position but may be extended relative to the frame to a tread position projecting beyond the bumper in a direction outwardly from the vehicle.

SUMMARY OF THE INVENTION

In one embodiment, an upwardly open frame, having parallel forward and rearward ends and opposing sides, is provided with clamp members on each of its sides at its forward end near its upper limit which grip a bumper flange projecting toward the vehicle and disposes the frame in a horizontal plane projecting toward the vehicle from the lower limit of the bumper. Adjustable arms, connected with the frame sides, project toward and engage the adjacent vertical surface of the bumper above the flange connected clamps. A bumper step, having a tread area, is slidably supported by the frame for movement from a frame nested position to an operative position in a direction outwardly from the vehicle. A hook-shaped member, connected with the step, engages a frame bottom cross member for horizontally supporting the step and normally preventing separation of the step from the frame.

In another embodiment, an upwardly open frame, similarly having parallel forward and rearward ends and opposing side members, is provided with clamp members on its rearward end near its upper limit and adjacent its respective sides which project toward the vehicle across the upper limit of a bumper and grip the upper bumper flange for disposing the frame adjacent the bumper in a direction outwardly from the vehicle. Adjustable arms, connected with the frame remote from the clamp members, engage an adjacent vertical surface of the bumper for desired orientation of the frame with respect to the bumper. A step, having a tread member, is movable from a vertical nested position in the frame to a horizontal position projecting beyond the upper limit of the frame in a direction outwardly from the vehicle and includes hook members longitudinally engaging a rabbeted edge of the frame for preventing separation of the step relative to the frame when in tread position.

The principal object of this invention is to provide a vehicle bumper step for access to a vehicle which includes an upwardly open frame connected with one of the flanges of a vehicle bumper and a step member movable from a retracted frame nested position to a horizontal tread position projecting beyond the bumper in a direction outwardly from the vehicle.

BRIEF DESCRIPTION OF THE DRAWINGS

FIG. 1 is a side elevational view of one embodiment of the bumper step in extended tread position connected with the bumper of a vehicle, such as a bus, the latter being illustrated by dotted lines;

FIG. 2 is an exploded perspective view, to a larger scale, of the bumper step illustrated by FIG. 1 and illustrating, by dotted lines, the position of the step portion when nested by the frame;

FIG. 3 is a perspective view of the bumper step, from another direction, with parts broken away for clarity;

FIG. 4 is a vertical cross sectional view, to a smaller scale, taken substantially along the line 4—4 of FIG. 3;

FIG. 5 is a perspective view of another embodiment of the bumper tread with the step in retracted position;

FIG. 6 is a perspective view similar to FIG. 5 illustrating the step in extended tread position;

FIG. 7 is a side elevational view, to another scale, illustrating the bumper step in the position of FIG. 6 when connected with a vehicle bumper, the latter being shown in cross section; and, FIG. 8 is a perspective view of the bumper step of FIG. 5 from another direction.

DESCRIPTION OF THE PREFERRED EMBODIMENTS

Like characters of reference designate like parts in those figures of the drawings in which they occur.

In the drawings:

Referring more particularly to FIGS. 1 through 4, the reference numeral 10 indicates a retractable step mounted on a bumper 12 attached to a vehicle 14. The bumper step 10 comprises an upwardly open generally rectangular frame 16 and a step portion 18 movable into and out of the frame 16. The frame 16 is characterized by a rearward cross member 20 connected with the rearward ends of a pair of side members 22 and 24 which are interconnected at their depending forward end portions by a frame front cross member 26. Intermediate their ends, the side members are interconnected by a frame cross bar 28 in the plane of the forward cross member 26.

A pair of strap-like clamp means 30 are connected with the respective forward end portion of the side members 22 and 24 adjacent their upper limit and project laterally outward therefrom in opposing directions. Each of the clamp means 30 is generally U-shaped open in a forward direction with one of its legs 32 integrally connected with the respective frame side member and its other leg 34 vertically spaced upwardly in parallel relation with respect to the bottom leg 32 for receiving an intermediate portion of the bottom flange 36 of the vehicle bumper 12 (FIG. 4). A stud bolt 38, threadedly extending through the respective clamp leg 34, frictionally engages the bumper flange 36 for connecting the frame to the bumper flange thus disposing the frame 16 in a generally horizontal plane projecting toward the vehicle.

A pair of arm means 40, integrally connected with the respective frame side 22 and 24, project angularly upward toward the bumper for contacting the inward generally vertical surface 42 of the bumper step and preventing upward tilting movement of the frame rearward portion when the step 18 is occupied, as presently explained. Each of the arm means comprises an elongated strap-like member 44 having a stub arm 46 longitudinally slidably connected with its end portion projecting toward the bumper by a bolt 48. The stub arm 46 has a longitudinal slot 50 which permits longitudinal adjustment of the effective length of the arm means in accordance with the irregularities of the inward surface 42 of the bumper.

The step 18 is horizontal flat-like in general configuration and dimensioned to be nested within the frame 16. The step comprises a forward end bar 52 and a rearward end bar 54 interconnected by step sides 56 and 58. A screen-like tread member, such as expanded metal, indicated by the crossed lines 60, extends horizontally between the step forward and rearward bars and side members and is rigidly secured thereto, as by welding. The step forward bar 52 projects laterally beyond its respective sides 56 and 58 and abuts the forward end of the respective frame sides 22 and 24 when the step is nested by the frame. The frame cross member 26 is provided with a recess 62 in its forward end portion for receiving the fingers of the user when pulling the step forwardly to the tread position, as illustrated by FIGS. 1 and 4.

Hook means 64 is connected with the rearward depending edge surface of the step rearward bar 54 medially its length for preventing separation of the step from the frame and to maintain the step in the horizontal plane of the frame when in tread position. The hook means 64 is formed from strap metal and is generally horizontal U-shaped with its top leg 66 connected with the rearward surface of the cross bar 54 and projecting rearwardly therefrom in a horizontal plane with its depending parallel leg 68 projecting forwardly. The spacing between the hook means legs 66 and 68 is such that it freely receives the rearward edge surface of the frame cross bar 28 (FIG. 4) when the step is extended. The rearward frame member 20 has its depending edge surface provided with a downwardly open recess 70 for passage of the hook means 64 when the step 18 is moved into and out of the frame 16.

Referring now to FIGS. 5 through 8, the reference numeral 75 indicates another embodiment of the bumper step connected with a vehicle bumper 76 generally arcuate in transverse section and having an upper flange 78. The bumper step 75 comprises an upwardly open frame 80 and a step portion 81 movable into and out of the frame. The frame 80 includes a forward end member 82 formed from a generally U-shaped section of strap metal having its legs 84 and 86 vertically disposed and secured to frame side members 88 and 90 respectively. The upper end portion of each end member leg 84 and 86 is rabbeted, as at 91, for the purposes presently explained. The depending ends of the side members 88 and 90 are connected by a frame bottom 92. The frame forward member 82 projects inwardly of the inner surface of the side members 88 and 90 and the bottom member 92 for maintaining the step 81 in a nested position within the frame in combination with upper and lower frame cross bars 94 and 96, respectively, secured to the upper and lower limits of the rearward surfaces of the side members 88 and 90 opposite the front member 82.

A pair of strap-like means 98 project rearwardly from the respective end portions of the upper cross bar 94 adjacent the upper limit of the frame. Each of the clamp means 98 is a generally horizontally disposed U-shaped member having one of its legs 100 elongated and connected at its forward end with the cross bar 94 with its other depending shorter leg 102 projecting toward the frame in depending parallel relation with respect to its upper leg 100 for receiving intermediate portions of the bumper flange 78. Stud bolts 104 project through the clamp means legs 102 for gripping the inward surface of the bumper flange 78 and maintaining the plane of the step frame 80 in a generally vertical plane adjacent that surface of the bumper outwardly from the vehicle.

The depending frame cross bar 96 is provided with rearwardly projecting arm means 106 for stabilizing the step frame 80 with respect to the bumper 76. Each of the arm means 106 comprises a bolt 108, or the like, threadedly secured to a boss 110 mounted on the cross bar 96 and having a bumper surface protective cap 112 on its end contacting the adjacent depending edge portion of the bumper 76.

The step 81 is rectangular and dimensioned to be nested within the confines of the frame 80. The step is formed by side rails 114 and 116 slidably received between the inner surfaces of the frame side members 88 and 90, respectively, and interconnected by top and bottom members 118 and 120, as viewed in FIGS. 5 and 8. Similarly, screening, such as expanded metal, or the like, 122 extends between and is secured to the inner surfaces of the step forming members.

An intermediate portion of the step side members 114 and 116 is nested by the rabbeted edge 91 and the depending edge surfaces, as viewed in FIG. 6, of the step side members 114 and 116 are each provided with a downwardly open notch 124 forming a hook means for cooperatively engaging the depending limit of the rabbeted edge. This prevents separating movement of the step from the frame and supports the step when in tread position in combination with a pair of lugs 126 secured to the upper limit of the frame cross bar 94 adjacent its respective ends. The lugs 126 project inwardly of the frame a sufficient distance to overlap intermediate portions of the step member 120 when the step is in tread position. The step member 118 is provided with a pair of upwardly open notches or recesses 128, as viewed in FIG. 6, to permit passage of the frame step member 118 into the frame when the step is in a stored position (FIGS. 5 and 8). Medially its ends the step member 118 is similarly provided with a recess 130 which forms a hand grip positioned in combination with a recess 132 cut out of the expanded metal 122 for lifting the step out of the frame and disposing it in tread position (FIG. 6).

The step 75 may be utilized as a vehicle license tag holder by securing the tag 135, indicated by heavy dashed lines (FIG. 5), to the surface of the expanded metal 122 so that the tag is visually exposed when the step member 81 is in its normal stored position.

OPERATION

In operation of the bumper step 18 (FIGS. 1 to 4) the frame 16 is attached to the depending flange 36 of the vehicle bumper in horizontal depending relation, as described hereinabove. When it is desired to position the step 18 in tread position, the operator pulls forwardly on the step cross bar 52 until the hook member 64 engages the frame cross bar 28 and, after using the step, it is placed in stored position by pushing the step to a nested position within the frame.

In the operation of the step 75 (FIGS. 5 through 8) the frame 80 is secured to the upper flange 78 of the bumper and adjusted to a substantially vertical plane, as described hereinabove. The step is placed in tread position by manually lifting the step in an upward direction until its cross member 120 is adjacent the depending limit of the lugs 126 and the step then pivoted away from the vehicle to dispose the notches 124 in engagement with the rabbeted edges 91. The step is retracted to a stored position by reversing the step extension action.

Obviously the invention is susceptible to changes or alterations without defeating its practicability. Therefore, I do not wish to be confined to the preferred embodiment shown in the drawings and described herein.

I claim:

1. A retractable step for a vehicle bumper having a generally vertical portion and upper and lower laterally projecting flanges normal to the plane of said vertical portion, the improvement comprising:
   an upwardly open frame having forward and rearward ends and having lateral sides spaced longitudinally of said bumper;
   clamp means secured to the upper limit of said frame adjacent its respective sides for gripping one said bumper flange,
      said clamp means comprising a clamp member projecting outwardly from said frame and doubled back upon itself to describe a U-shape having parallel legs, and,
      a stud bolt projecting through one said leg normal to the plane thereof;
   arm means connected with said frame and projecting toward said bumper in the direction of said clamp means for stabilizing the position of said frame relative to said bumper,
      said arm means comprising an elongated arm, a stub arm overlapping the end portion of said arm opposite said frame and having a longitudinal slot therein, and,
      bolt means securing said stub arm to said elongated arm;
   a step movable from a first position nested by said frame to a second position projecting beyond and normal to the vertical portion of said bumper; and,
   hook means for normally preventing separation of said step relative to said frame.

2. The bumper step according to claim 1 in which said hook means comprises:
   a cross bar extending between said frame sides intermediate their ends; and,
   a hook-shaped member secured to said step adjacent the rearward end of said frame for engaging said cross bar when said step is in said second position.

3. A retractable step for a vehicle bumper having a generally vertical portion and upper and lower laterally projecting flanges normal to the plane of said vertical portion, the improvement comprising:
   an upwardly open frame having vertical forward and rearward end members and having lateral sides spaced longitudinally of said bumper,
      said frame end members having a rabbeted edge adjacent their upper limit;
   clamp means secured to the upper limit of said frame adjacent its respective sides for gripping one said bumper flange;
   arm means connected with said frame and projecting toward said bumper in the direction of said clamp means for stabilizing the position of said frame relative to said bumper;
   a step movable from a first position nested by said frame to a second position projecting beyond and normal to the vertical portion of said bumper,
      said step having side rails each having a notch formed in one edge surface for cooperative engagement with said rabbeted edge and preventing separation of said step relative to said frame when said step is in said second position; and,
   a lug secured to the upper limit of said frame and overlapping an edge portion of said step when in said second position.

* * * * *